Figure 3:
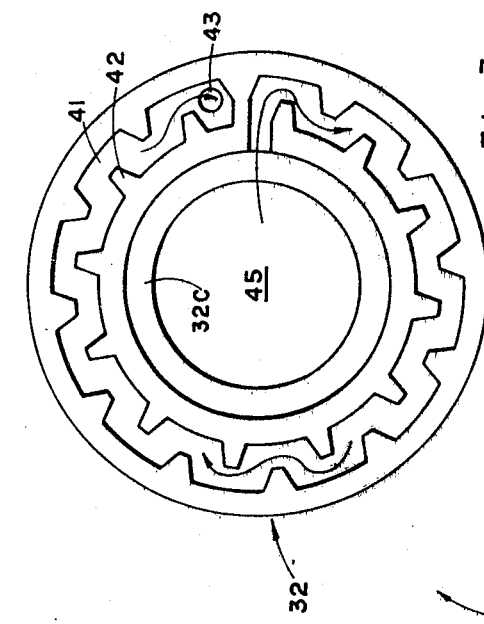

United States Patent [19]

Mehoudar

[11] 4,384,680
[45] * May 24, 1983

[54] FLUID FLOW REGULATOR UNIT

[75] Inventor: Raphael Mehoudar, Tel-Aviv, Israel

[73] Assignee: Hydro-plan Engineering Ltd., Tel-Aviv, Israel

[*] Notice: The portion of the term of this patent subsequent to Jun. 24, 1997, has been disclaimed.

[21] Appl. No.: 143,098

[22] Filed: Apr. 23, 1980

Related U.S. Application Data

[63] Continuation-in-part of Ser. No. 845,277, Oct. 25, 1977, Pat. No. 4,209,133.

[51] Int. Cl.³ .............................................. B05B 15/00
[52] U.S. Cl. .................................................... 239/542
[58] Field of Search ............... 239/542, 533.13, 533.14, 239/547; 138/43

[56] References Cited

U.S. PATENT DOCUMENTS

| | | |
|---|---|---|
| 3,812,876 | 5/1974 | Krieter . |
| 3,882,892 | 5/1975 | Menzel .................... 239/542 X |
| 3,979,070 | 9/1976 | Lemelshtrich .................. 239/542 |
| 4,011,893 | 3/1977 | Bentley ......................... 138/43 |
| 4,209,133 | 6/1980 | Mehoudar ..................... 239/542 |

FOREIGN PATENT DOCUMENTS

| | | | |
|---|---|---|---|
| 2535732 | 2/1976 | France .......................... 239/542 |
| 2369002 | 5/1978 | France .......................... 239/542 |

Primary Examiner—John J. Love
Assistant Examiner—Paul A. Sobel
Attorney, Agent, or Firm—Sandler & Greenblum

[57] ABSTRACT

A fluid flow regulator unit comprising a hollow casing; means of defining inlet and outlet control chambers; flow connection means for flow connecting the inlet chamber to a fluid supply conduit; the casing having a surface containing an outlet aperture for flow connecting the outlet chamber to the exterior of the casing; fluid flow restricting means having an inlet and an outlet respectively connected to the inlet and outlet chambers; and a resilient flexible member responsive to the difference in fluid pressure between the inlet and outlet chambers for elastic deformation into cooperation with the aperture in the casing thereby establishing a flow restriction for fluid passing through the aperture whenever the pressure differential across the member exceeds a predetermined value.

5 Claims, 4 Drawing Figures

FLUID FLOW REGULATOR UNIT

The present application is a continuation-in-part of a copending application Ser. No. 845,277 filed 10-25-77 entitled Drip Level Irrigation Emitter Unit, now U.S. Pat. No. 4,209,133, issued June 24, 1980.

This invention relates to fluid flow regulator units which include flow restricting means such that fluid, constrained to pass therethrough, has its pressure reduced from an initial supply pressure to a lower outflow pressure.

It has long been recognised that the operation of such regulator units is particularly sensitive to variations in the upstream and downstream pressures of the fluid. Thus, such variations can well lead to variations in the outflow rate and these variations can be undesirable.

It is an object of the present invention to provide a fluid flow regulator unit with a control mechanism whereby variations of the outflow rate of the unit with variations of the upstream and downstream supply pressures are reduced to a minimum.

According to the present invention there is provided a fluid flow regulator unit comprising:
 a casing member;
 a body member retainably fitted within the casing member;
 inner wall portions of said emitter unit defining inlet and outlet control chambers;
 said emitter unit having an outlet aperture connected to said outlet control chamber;
 one of said members having an internally disposed surface;
 an outer annular portion of said surface having an elongated flowpath formed therein;
 a central cavity portion of said emitter unit including said outlet control chamber and being surrounded by said outer annular portion;
 said body member having an inner peripheral rim surrounding said cavity portion and spaced from said outlet aperture;
 a first end of said flowpath communicating with said inlet control chamber and a second end of said flowpath communicating with said outlet control chamber;
 said rim defining an area substantially greater than that of said outlet aperture;
 a resiliently flexible membrane adapted to be held against said inner peripheral rim and separating said inlet and outlet control chambers;
 flow coupling means for flow coupling said inlet control chamber to a fluid supply conduit, the arrangement being such that upon the fluid pressure in said inlet chamber exceeding the fluid pressure in the outlet chamber by a predetermined amount, said membrane flexes elastically towards the outlet aperture so as to define, with a rim of the aperture, a restricted outflow path thereby limiting variations in the outflow rate.

Figure 1:
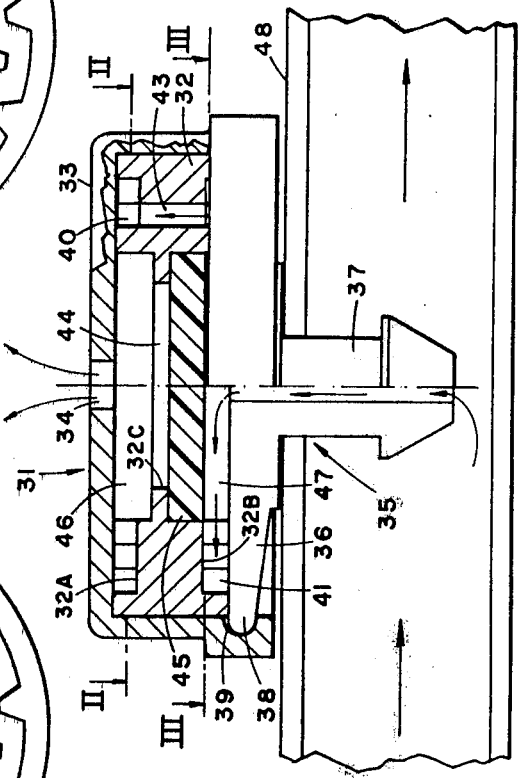
Figure 2:
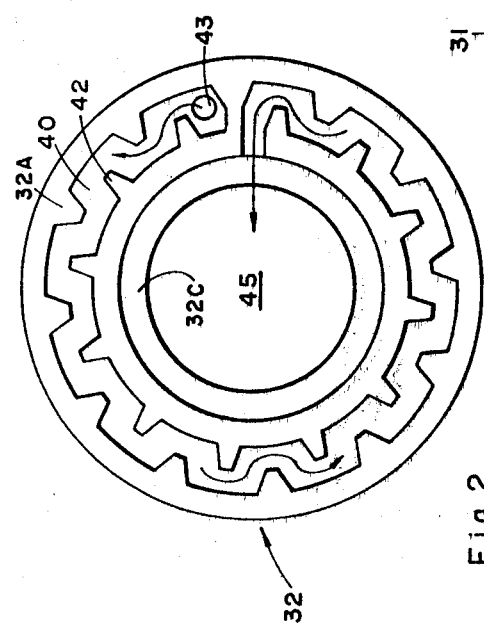
Figure 4:
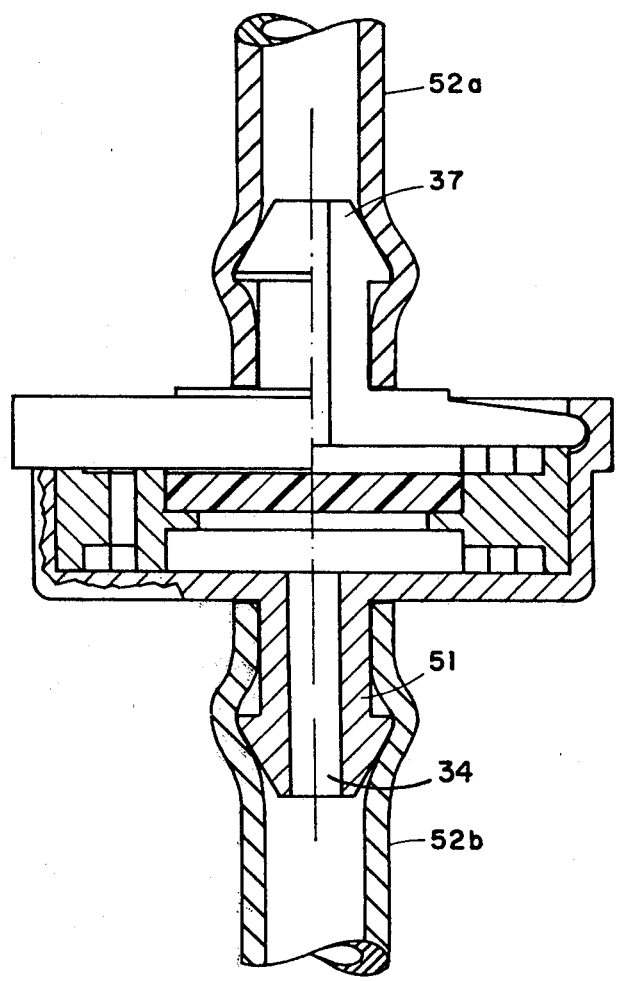

Various embodiments of fluid flow regulator units in accordance with the present invention will now be described by way of example and with reference to the accompanying drawings in which:

FIG. 1 is a longitudinally sectioned view of a fluid flow regulator unit in accordance with the present invention constituting a drip level irrigation emitter unit shown fitted to an irrigation pipe, FIG. 2 is a cross-sectional view of the unit shown in FIG. 1 taken along the line II—II, FIG. 3 is a cross-sectional view taken along line III-—III shown in FIG. 1, and FIG. 4 is a cross-sectional view of a modification of the unit shown in FIG. 1.

Reference will now be made to FIGS 1-3 of the drawings in which is illustrated a flow regulator unit in the form of a drip emitter unit.

The emitter unit comprises a casing 31 and a body member 32. The casing 31 consists of a cylindrical cap member 33, open at the base and formed at its upper surface with a centrally located outlet aperture 34. The casing furthermore comprises a separate base member 35 consisting of a base disc 36 and a central, downwardly depending, centrally bored coupling nipple 37. The outer rim 38 of the base disc 36 is adapted to be snap fitted in a corresponding peripheral groove 39 formed on the inner edge of the skirt of the casing. The body member 32 has an annular upper surface 32A and an annular lower surface 32B surrounding a central aperture or cavity portion 44 defined by an inner peripheral rim 32C which extends into the cavity portion and is spaced from the outlet aperture 34. The outer annular portions of surfaces 32A and 32B are essentially planar but contain circular restricting flowpaths 40, 41, respectively, each of which is formed at its upper and lower surfaces with circular grooves, respectively, provided with baffle sets 42 comprising baffle elements of the kind disclosed in U.S. Pat. No. 4,215,822, issued Aug. 5, 1980. The groove 41 communicates with the groove 40 via a duct 43. The central aperture 44 defined by the annular body member 32 is closed by means of a disc-like membrane 45 which is normally pressed against the rim of the aperture 44 by upwardly directed water pressure.

The membrane 45 separates an upper outlet control chamber 46 defined by the casing 31 and the membrane 45 from a lower inlet control chamber 47 defined by the disc-like base 36 and the membrane 45.

In use, and with the emitter unit assembled on an irrigation pipe 48 as shown in the drawings, a portion of the water flowing through the pipe 48 passes through the nipple 37 into the inlet control chamber 47 and via the groove 41 and baffles 42, the duct 43, the groove 40 and baffles 42, emerging into the outlet control chamber 46 and from there as a pressureless drip through the outlet aperture 34.

The membrane 45 is so chosen and located vis-a-vis the outlet aperture 34 that the pressure in the outlet chamber 46 is always maintained a predetermined amount less than the pressure in the inlet chamber 47. Thus, a rise in the main supply pressure of the water flowing through the irrigation pipe 48 is accompanied by a rise in the pressure in the inlet control chamber 47. As a consequence, the rate of flow through the groove 41 into the outlet chamber 46 tends to rise. Any such increase in the rate of flow tends, of itself to give rise to an increased pressure differential between the inlet and outlet chambers 46 and 47 and therefore across the membrane 45. Such an increased pressure differential tends to cause the membrane 45 to flex towards the outlet aperture 34 thereby creating a restricted flowpath defined between the arched membrane 45 and the rim of the aperture 34. As a consequence, the pressure in the outlet chamber 46 tends to rise, the predetermined pressure differential tends to be restored and therefore the differential pressure between the two ends of the groove 41 is maintained constant the flow rate through the groove and therefore the overall outflow rate is maintained constant within a relatively narrow range.

Any tendency for the outlet aperture 34 to become blocked immediately causes a reduction in the flow rate through the restricting flowpath with a consequent decrease in the pressure differential giving rise to a return movement of the membrane 45 and the flushing out of the blockage through increased passageway now available between the membrane and the rim of the outlet aperture.

As can be seen the membrane 45 is spaced a relatively substantial distance from the outlet aperture 34 and in this way it can be ensured that a relatively substantial displacement of the membrane 45 is required before the outflow rate is restricted. In this way, it can be ensured that the displacement of the membrane 45 does not of itself introduce undesirable losses during the pressure differential build-up period operation range of the units.

Furthermore, it can be seen that the size of the outlet aperture 34 is relatively small as compared with the size of the membrane 45. This is necessary in order to ensure that the predetermined pressure differential between the chambers 46 and 47 previously referred to is not unduly influenced by the magnitude of the inflow pressure.

It will furthermore be seen that the provision of the flexibly resilient, i.e. elastic membrane 45 serves in effect a triple purpose, namely:

(1) it sealingly separates the inlet from the outlet control chamber;

(2) it serves to define, with the rim of the outlet aperture the restricted outflow path, and (3) being elastic there is obviated the necessity of providing mechanical means such as, for example, a spring to ensure the return displacement of the membrane.

In the embodiment shown in FIG. 4 of the drawings a fluid flow regulator unit, substantially identical in construction with that shown and described above with reference to FIGS. 1-3 of the drawings has its outlet aperture 34' associated with a further coupling nipple 51. With this construction and with the coupling nipples 37 and 51 respectively coupled to flow conduits 52a and 52b a fluid flow (e.g. an i.v. liquid infusion flow) passing through the conduit 52a emerges out of the unit into the conduit 52b with a predetermined reduced outflow rate which is maintained substantially invariant despite variations of the supply pressure.

With the use of such a modified unit as a drip emitter unit, the coupling nipple 37 is, as before, inserted into a main irrigation pipe (not shown) and the outlet coupling nipple 51 is coupled to an emitter conduit from which the drip like outflow emerges. This construction allows, for example, for the irrigation pipe and the emitter units to be located slightly below ground surface (e.g. for protection against birds) and for the emitter conduit to emerge from the ground at the required location.

Furthermore the membrane 45 can be formed integrally with the rim 32c of the body member 32 being so dimensioned as to have the required degree of flexibility as compared with that of the body member.

Whilst in the embodiment specifically described above the flow restricting means has been an elongated channel along which the water is constrained to flow, restricting means of other constructions can equally well be employed with control mechanisms in accordance with the present invention.

I claim:

1. A flow regulator unit comprising: a casing member; a body member retainably fitted within the casing member; inner wall portions of said unit defining inlet and outlet control chambers; said emitter unit having an outlet aperture connected to said outlet control chamber; one of said members having an internally disposed surface; an outer annular portion of said surface having an elongated flowpath formed therein; a central cavity portion of said unit including said outlet control chamber and being surrounded by said outer annular portion; said body member having an inner peripheral rim surrounding said cavity portion and spaced from said outlet aperture; a first end of said flowpath communicating with said inlet control chamber and a second end of said flowpath communicating with said outlet control chamber; said rim defining an area substantially greater than that of said outlet aperture; a resiliently flexible membrane adapted to be held against said inner peripheral rim and separating said inlet and outlet control chambers; and flow coupling means for flow coupling said inlet control chamber to a fluid supply conduit, the arrangement being such that upon the fluid pressure in said inlet chamber exceeding the fluid pressure in the outlet chamber by a predetermined amount, said membrane flexes elastically towards the outlet aperture so as to define, with a rim of the aperture, a restricted outflow path thereby limiting variations in the outflow rate, at least one planar surface of said body member constituting said outer annular portion in which is formed said elongated flowpath, at least one planar surface of said body member constituting said outer annular portion in which is formed said elongated flow path.

2. A fluid flow regulator unit comprising: a casing member; a body member retainably fitted within the casing member; inner wall portions of said unit defining inlet and outlet control chambers; said emitter unit having an outlet aperture connected to said outlet control chamber; one of said members having an internally disposed surface; an outer annular portion of said surface having an elongated flowpath formed therein; a central cavity portion of said unit including said outlet control chamber and being surrounded by said outer annular portion; said body member having an inner peripheral rim surrounding said cavity portion and spaced from said outlet aperture; a first end of said flowpath communicating with said inlet control chamber and a second end of said flowpath communicating with said outlet control chamber; said rim defining an area substantially greater than that of said outlet aperture; a resiliently flexible membrane adapted to be held against said inner peripheral rim and separating said inlet and outlet control chambers; and flow coupling means for flow coupling said inlet control chamber to a fluid supply conduit, the arrangement being such that upon the fluid pressure in said inlet chamber exceeding the fluid pressure in the outlet chamber by a predetermined amount, said membrane flexes elastically towards the outlet aperture so as to define, with a rim of the aperture, a restricted outflow path thereby limiting variations in the outflow rate, at least one planar surface of said body member constituting said outer annular portion in which is formed said elongated flowpath, said inlet and outlet control chambers being respectfully formed with coupling members.

3. A fluid flow regulator unit comprising:
a casing member;
an outlet aperture formed in said casing member;

an annular body located within the casing member and having formed therein a central throughgoing cavity;

a cap member held within the casing member and serving to retain the annular body therein;

a first annular surface of said body having an elongated groove formed therein and defining with an adjacent surface of one of said members, an elongated flowpath;

an inner peripheral rim of said annular body surrounding said cavity and spaced from said outlet aperture, said rim defining an area substantially greater than that of said outlet aperture;

a resiliently flexible membrane juxtaposed with respect to said inner peripheral rim;

wall portions of said annular body, said membrane and said cap member defining an inlet control chamber communicating with one end of said flowpath;

wall portions of said annular body, said membrane and said casing member including said aperture defining an outlet control chamber communicating with an opposite end of said flowpath and constituting at least part of said cavity; and flow coupling means for flow coupling said inlet control chamber to a fluid supply conduit, the arrangement being such that upon the fluid pressure in said inlet chamber exceeding the fluid pressure in the outlet chamber by a predetermined amount, said membrane flexes elastically towards the outlet aperture so as to define, with a rim of the aperture, a restricted outflow path thereby limiting variations in the outflow rate.

4. A fluid flow regulating device according to claim 3 wherein a second and opposite annular surface of said body has an elongated groove formed therein and defines with an adjacent surface of the other of said members a further elongated flowpath communicating at an end thereof with an end of said first mentioned flowpath.

5. A fluid flow regulator unit according to claim 3 wherein said membrane is adapted to be pressed sealingly against said inner peripheral rim solely under the influence of fluid pressure in said inlet control chamber.

* * * * *